US010540280B2

(12) United States Patent
Fowler et al.

(10) Patent No.: US 10,540,280 B2
(45) Date of Patent: Jan. 21, 2020

(54) HIGH-SPEED SELECTIVE CACHE INVALIDATES AND WRITE-BACKS ON GPUS

(71) Applicants: Advanced Micro Devices, Inc., Sunnyvale, CA (US); ATI Technologies ULC, Markham (CA)

(72) Inventors: Mark Fowler, Boxborough, MA (US); Jimshed Mirza, Markham (CA); Anthony Asaro, Markham (CA)

(73) Assignees: ADVANCED MICRO DEVICES, INC., Sunnyvale, CA (US); ATI TECHNOLOGIES ULC, Markham, Ontario (CA)

( * ) Notice: Subject to any disclaimer, the term of this patent is extended or adjusted under 35 U.S.C. 154(b) by 59 days.

(21) Appl. No.: 15/390,080

(22) Filed: Dec. 23, 2016

(65) Prior Publication Data
US 2018/0181488 A1 Jun. 28, 2018

(51) Int. Cl.
*G06F 12/1009* (2016.01)
*G06T 1/20* (2006.01)
*G06F 12/0804* (2016.01)
*G06F 12/0891* (2016.01)

(52) U.S. Cl.
CPC ...... *G06F 12/0804* (2013.01); *G06F 12/0891* (2013.01); *G06F 12/1009* (2013.01); *G06T 1/20* (2013.01); *G06F 2212/455* (2013.01)

(58) Field of Classification Search
None
See application file for complete search history.

(56) References Cited

U.S. PATENT DOCUMENTS

| | | | | |
|---|---|---|---|---|
| 7,932,911 B2 * | 4/2011 | Hansen | ............... | G06F 9/30014 345/522 |
| 2013/0262736 A1 * | 10/2013 | Kegel | ................. | G06F 12/0888 711/3 |
| 2015/0310580 A1 * | 10/2015 | Kumar | ................ | G06F 12/1009 345/502 |
| 2016/0210231 A1 * | 7/2016 | Huang | ................. | G06F 12/0811 |

\* cited by examiner

*Primary Examiner* — Peter Hoang
(74) *Attorney, Agent, or Firm* — Volpe and Koenig, P.C.

(57) ABSTRACT

Techniques for performing cache invalidates and write-backs in an accelerated processing device (e.g., a graphics processing device that renders three-dimensional graphics) are disclosed. The techniques involve receiving requests from a "master" (e.g., the central processing unit). The techniques involve invalidating virtual-to-physical address translations in an address translation request. The techniques include splitting up the requests based on whether the requests target virtually or physically tagged caches. Addresses for the portions of a request that target physically tagged caches are translated using invalidated virtual-to-physical address translations for speed. The split up request is processed to generate micro-transactions for individual caches targeted by the request. Micro-transactions for physically and virtually tagged caches are processed in parallel. Once all micro-transactions for a request have been processed, the unit that made the request is notified.

20 Claims, 6 Drawing Sheets

HIGH-SPEED SELECTIVE CACHE INVALIDATES AND WRITE-BACKS ON GPUS

TECHNICAL FIELD

The disclosed embodiments are generally directed to graphics processing, and, in particular, to high-speed processing of cache invalidate and write-back requests.

BACKGROUND

Hardware for rendering three-dimensional graphics is highly parallel and includes a large number of individual processing units that request data from memory, perform calculations on the data, and provide processed data to a frame buffer for output to a screen. Accessing data in memory typically involves a large amount of latency. Cache systems are provided to reduce that latency. However, because of the large amount of data typically processed in rendering operations, additional improvements in cache memory performance are desirable.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for performing cache invalidates and write-backs in an accelerated processing device (e.g., a graphics processing device that renders three-dimensional graphics). The techniques involve receiving requests from a "master" (e.g., the central processing unit). The techniques involve invalidating virtual-to-physical address translations in an address translation request. The techniques include splitting up the requests based on whether the requests target virtually or physically tagged caches. Addresses for the portions of a request that target physically tagged caches are translated using invalidated virtual-to-physical address translations for speed. The split up request is processed to generate micro-transactions for individual caches targeted by the request. Micro-transactions for physically and virtually tagged caches are processed in parallel. Once all micro-transactions for a request have been processed, the unit that made the request is notified.

Figure 1:
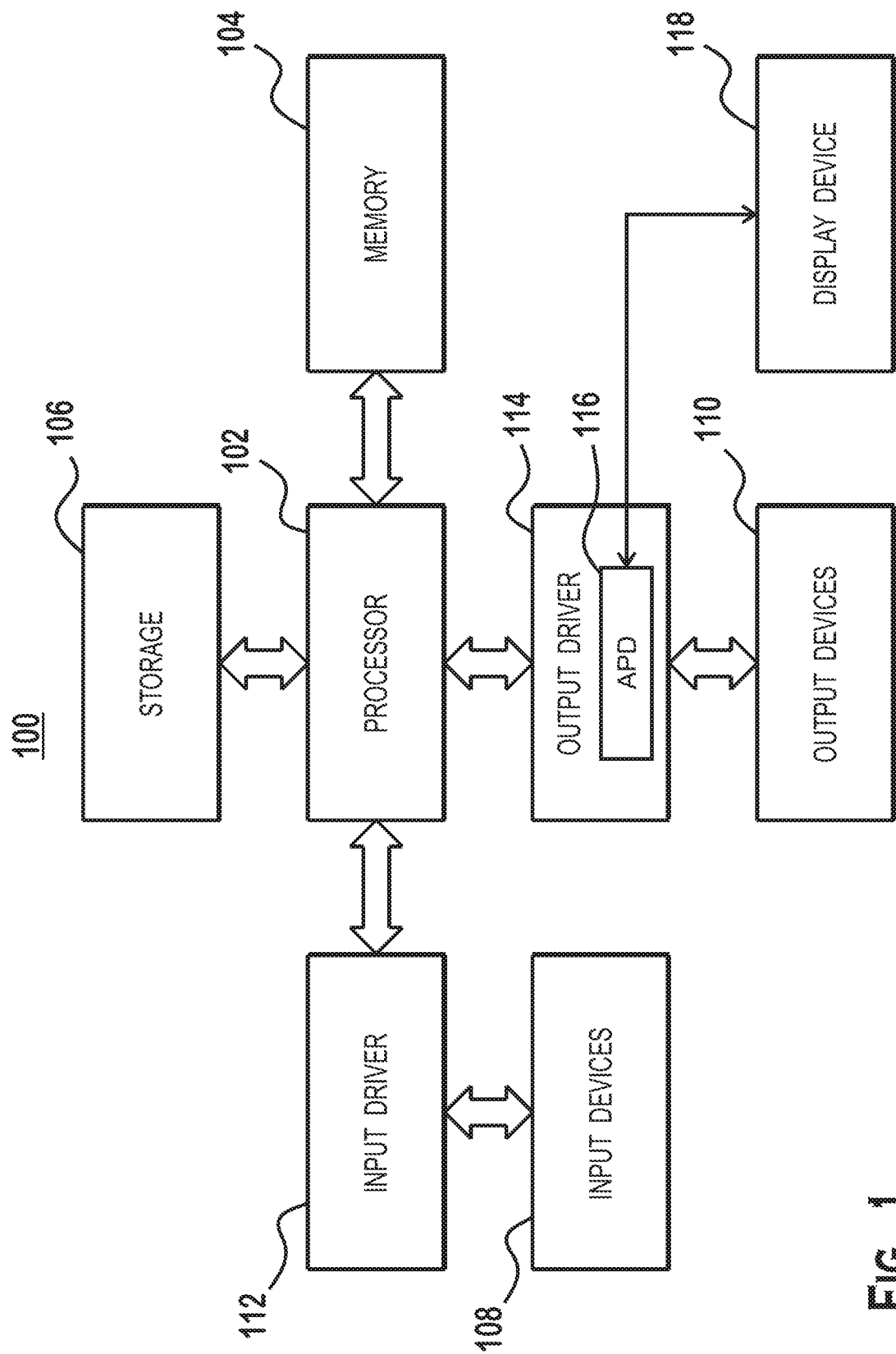
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
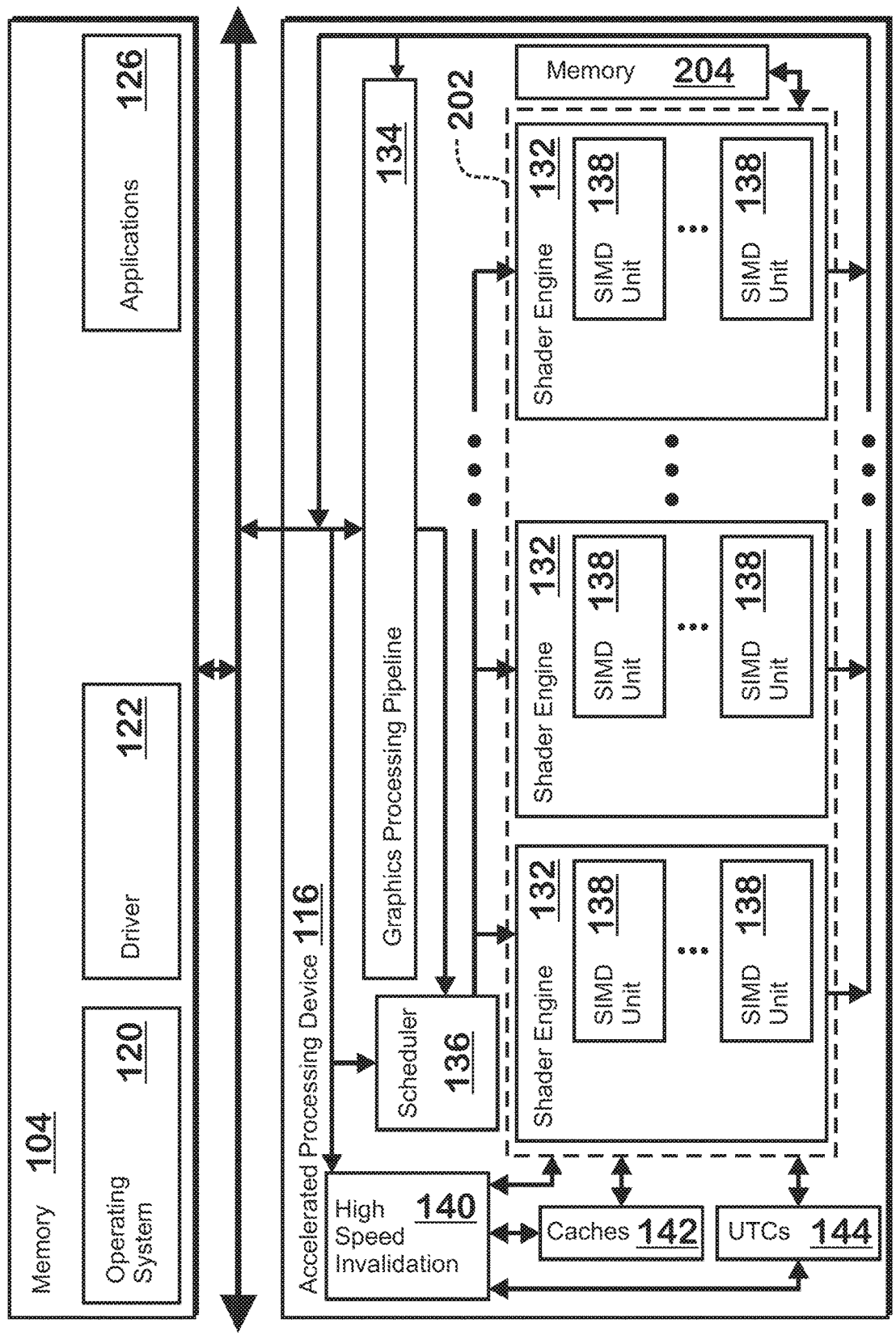
FIG. 2 is a block diagram illustrating an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed. The compute units 132 include cache systems 140 that cache data retrieved from memory, such as APD memory 204 within APD 116 or system memory 104.

The basic unit of execution in compute units 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). Alternatively, wavefronts may be larger than (include more work-items than can fit in) the width of a SIMD unit 138.

A scheduler 136 is configured to perform operations related to scheduling various wavefronts on different compute units 132 and SIMD units 138. Scheduling involves assigning wavefronts for execution on SIMD units 138, determining when wavefronts have ended, determining when wavefronts have stalled and should be swapped out with other wavefronts, and other scheduling tasks. The scheduler 136 may also act as a command processor, receiving commands (such as graphics commands or compute commands) from other elements of the device 100 like the processor 102 or the like, and orchestrating the processing of such commands on the APD 116.

The parallelism afforded by the compute units 132 is suitable for graphics related operations such as pixel value calculations, vertex transformations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

APD memory 204 acts as general memory for various portions of the APD 116. The APD memory 204 may store various items of data for various components of the APD 116, such as the shader engines 132, the graphics processing pipeline 134, or other elements.

Caches 142 represent various cache memories located in different locations throughout the APD 116. The caches 142 may include multiple cache memories organized in a hierarchical manner (e.g., level 0, level 1, level 2, and so on). In some implementations, cache memories of lower levels are included within or are specific to smaller groupings of computational units of the parallel processing units 202. For example, a level 0 cache may be specific to a SIMD unit 138 or grouping of SIMD units 138, a level 1 cache may be specific to a shader engine 132, a level 2 cache may be specific to the APD 116, and so on. Multiple individual cache memories may exist at any particular hierarchy level. It should be understood that although caches 142 are shown as having a particular location in APD 116, caches 142 may be split up and located in various portions of the APD 116.

Caches 142 act as a copy of a small portion of an entire memory address space. The limited size and physical proximity of a cache memory to the functional unit that accesses that cache memory (e.g., a SIMD unit 138) reduces latency for the data stored in the cache memory. Lower levels of the hierarchy are smaller and have lower latency. Functionally, the hierarchical nature of the caches 142 is reflected in the fact that, usually, lower levels are searched for data first, with a miss in any particular level causing a search for data at the next highest level. Individual cache memories in the caches 142 may store particular types of data (e.g., texture data, instructions, or other types of data).

Cache memories in caches 142 may be virtually or physically tagged. Tagging in a cache is a way to obtain a particular piece of data given the memory address used for looking up that data. A virtually tagged cache is a cache in which virtual memory addresses, as opposed to physical memory addresses, are used to look up data in that cache. A physically tagged cache is a cache in which physical memory addresses are used to look up data in that cache. As is generally known, virtual memory addressing is a technique by which the physical memory address of a data or portion of data is obscured for use by less trusted agents such as applications 126, for purposes of security and also for organization. Typically, the operating system 120 manages page tables that store translations from virtual to physical addresses so that hardware can determine the physical memory address for any given virtual address. These translations may be stored in various caches throughout the device 100 to improve the latency of obtaining address translations.

Data stored in any particular cache memory in caches 142 may be invalidated for various reasons. Invalidation involves marking a particular piece of data in the cache memory as being invalid. A lookup in a cache that would otherwise hit a piece of data (e.g., because the address for which the lookup was requested matches the address of a piece of data in the cache) would instead result in a miss if that particular piece of data is marked as invalid.

In addition, data stored in a particular cache memory in caches 142 may be "written back." Write-backs involve writing data up through the cache hierarchy so that the data is reflected in physical memory. In one example, a particular piece of data is written back from a level 0 cache memory. This write back involves writing the memory to a level 1 cache, a level 2 cache, and so on, until the data is reflected in physical memory.

The APD 116 includes universal translation caches ("UTC's") 142 (also sometimes referred to as "address translation caches") that assist with memory address translation from virtual to physical addresses. As with caches 142, the UTCs 144 may include multiple individual UTC memories organized in a hierarchy that store translations from virtual to physical addresses. Various components of the APD 116 use the UTCs 144 to translate virtual to physical addresses for various reasons. As with any other cache, entries in the UTCs 144 may be invalidated for various reasons. An invalid entry cannot be used to translate virtual addresses to physical addresses, except for in specific instances described herein. Thus, a typical virtual-to-physical address lookup performed to service an instruction executing in a SIMD unit 138 cannot be serviced by an invalid piece of data in a UTC cache of UTCs 144.

The high-speed invalidation block 140 accepts and processes requests from various clients (also referred to herein as "masters") to write back and/or invalidate data in the UTCs 144 and caches 142. Such invalidations are useful to reduce latency associated with cache write-backs that occur when data is to be written to the cache but there are no available entries for such data. Prediction algorithms can be used to predict when particular data stored in the cache is no longer needed; such data can be written back and invalidated so that the entry storing that data can be used for other data in the cache. However, prediction algorithms are not perfectly correct and do make mistakes. Thus the high-speed invalidation block 140 provides a mechanism to process fine-tuned application-specific requests for cache write-backs and invalidations. The clients that can provide requests for invalidations or write-backs include, but are not limited to, the shader engines 132, the processor 102, and other clients. The high-speed invalidation block is discussed in greater detail below with respect to FIGS. 4-6.

Figure 3:
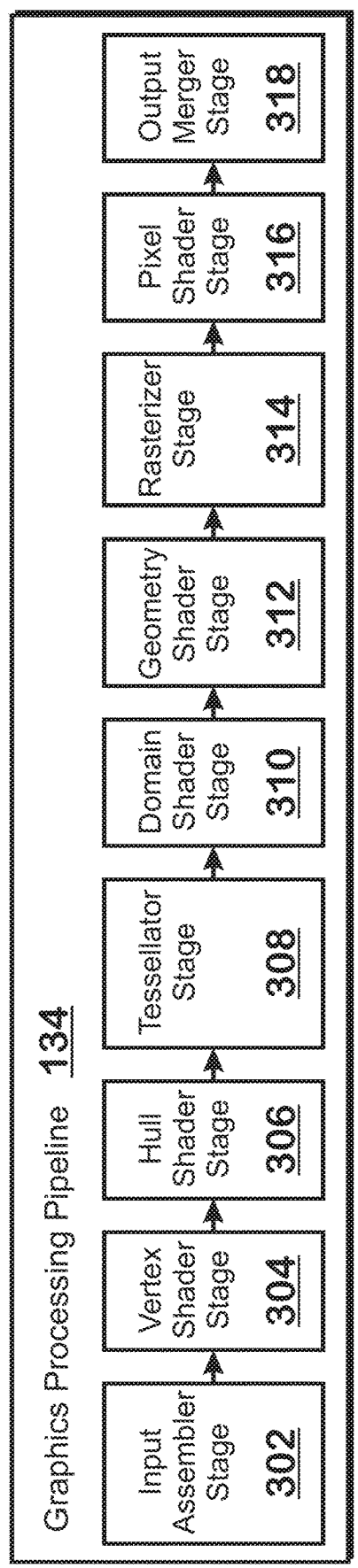
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 may modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Figure 4:
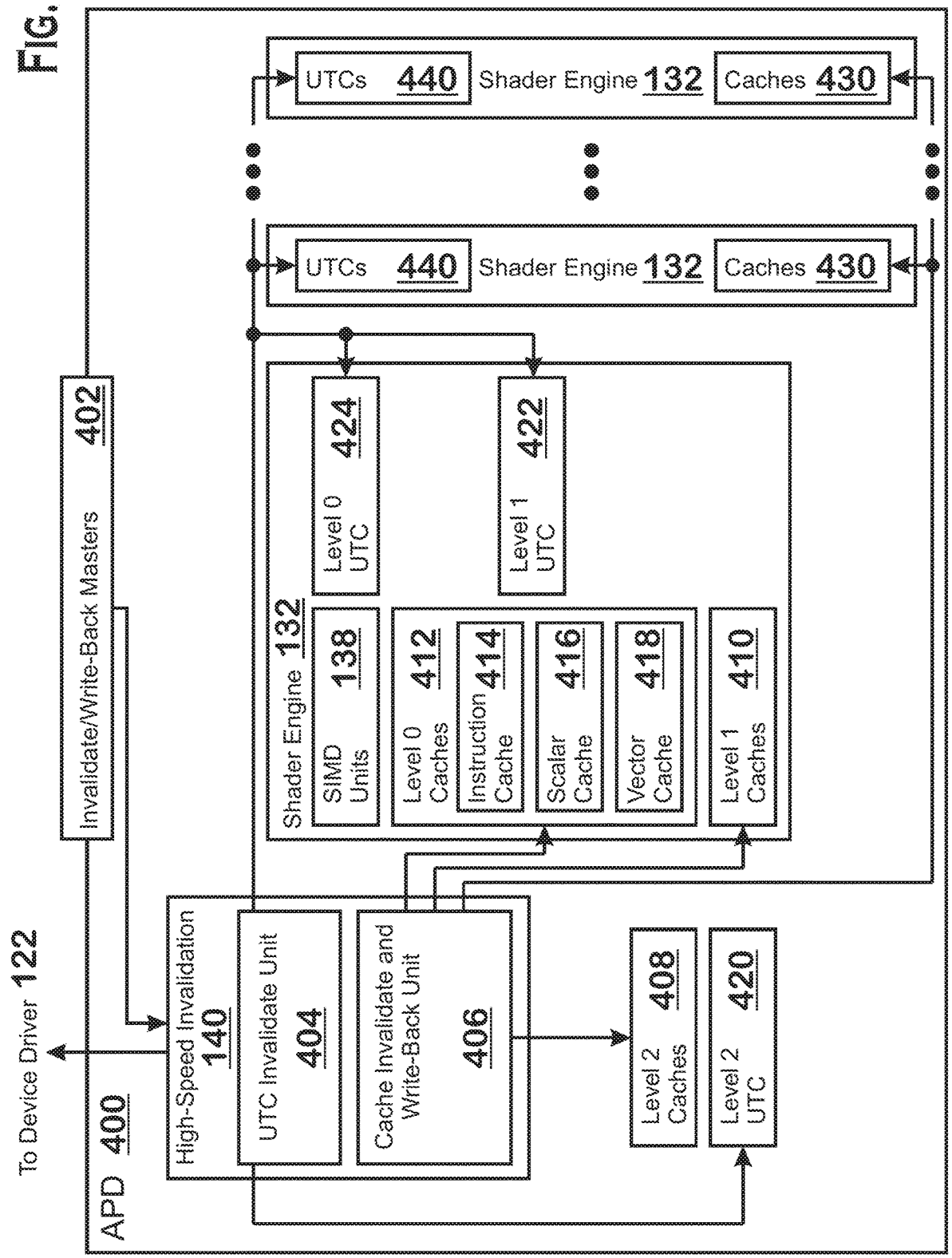
FIG. 4 is an illustration an example accelerated processing device, illustrating one example configuration of caches and universal translation caches of FIG. 2 and the manner in which the high-speed invalidation block of FIG. 2 interacts with those elements.

FIG. 4 is an illustration an example APD 400, illustrating one example configuration of caches 142 and UTCs 144 of FIG. 2 and the manner in which the high-speed invalidation block 140 of FIG. 2 interacts with those elements. APD 400 is one example configuration of the APD 116 illustrated in FIG. 2. For clarity and conciseness, some elements illustrated in the APD 116 of FIG. 2 are omitted from FIG. 4. However, it should be understood that elements illustrated in the APD 116 of FIG. 2 and not illustrated in the APD 400 are nevertheless included in the APD 400 of FIG. 4.

The caches 142 illustrated in FIG. 4 include level 2 caches 408, which are in common use for the various components of the APD 400. In some implementations, the level 2 caches 408 act as the highest level caches in the APD 400, meaning that a miss in a level 2 cache 408 results in a cache fill request to an appropriate memory unit (e.g., system memory 104 or APD memory 204 or another appropriate memory unit).

The caches 142 also include level 1 caches 410 that are specific to each shader engine 132. "Specific to a shader engine 132" means that the level 1 caches service requests for cache fills in level 0 caches 412 in the event of a miss in a level 0 cache 412 in a particular shader engine 132 but not in other shader engines 132. In some examples, each shader engine 132 includes multiple level 1 caches 410, each of which is specific to a particular sub-grouping of SIMD units 138 referred to as a shader array herein.

The caches 142 also include level 0 caches 412, which act as a lowest level cache for memory access requests made within the APD 400. The level 0 caches 412 include one or more instruction caches 414, which serves as a cache for instructions executed by the SIMD units 138, one or more scalar caches 416, which serve as a cache for scalar values used by shader programs, and one or more vector caches 418, which serve as a cache for vector values used by shader programs. Scalar values are values where multiple work-items executing in a SIMD unit 138 access the same piece of data. Vector values are values used to store multiple pieces of data, for use by multiple work-items executing simultaneously. Level 0 caches 412 may be specific to particular shader engines 132 or may be specific to other groupings of SIMD units 138 not directly in accord with shader engines 132. Caches 430 include level 1 caches 410 and level 0 caches 412 in shader engines 132 and UTCs 440 include level 1 UTC 422 and level 0 UTC 424 in shader engines 132. These elements (430 and 440) are illustrated collectively for graphical conciseness.

The UTCs 144 include a hierarchically organized set of caches for virtual-to-physical address translation. The level 2 UTC 420 acts as the highest level of UTC for the APD 400. A level 1 UTC 422 serves as the next level in the cache hierarchy and a level 0 UTC 424 serves as the lowest level in the hierarchy. Elements, such as SIMD units 138, obtain address translations by searching a level 0 UTC 424 first, then a level 1 UTC 422 if there is a miss in the level 0 UTC 424, and then the level 2 UTC 420 if there is a miss in the level 1 UTC 422. If a miss occurs in the level 2 UTC 420, then page tables are searched (a "page walk" is performed) to obtain the requested mapping. The operating system 120 handles page walks and returns requested mappings with the assistance of the device driver 122.

Invalidate/write-back masters 402 include units that are able to send requests to the high-speed invalidation 140 to invalidate and/or write-back data from cache memories in caches 142. The invalidate/write-back masters 402 may include dynamic memory access agents that fetch requests from buffers in the memory space (e.g., in memory 104). Such requests may be placed into the buffers at the request of various elements in the device 100, such as the applications 126, an operating system 120, device driver 122, or the like, and read to the high-speed invalidation unit 140 from such buffers by dynamic memory access agents (not shown) located within or associated with the APD 400. The invalidate/write-back masters 402 may also include the scheduler 136 of FIG. 2, which acts, at least in part, as a command processor, receiving commands (such as graphics commands or compute commands) from other elements of the device 100 like the processor 102 or the like, and orchestrating the processing of such commands on the APD 116. It should be understood that the masters 402 described herein do not constitute all possible masters that can provide requests for invalidation or cache write-backs, and that any hardware or software element within the device 100 (or even external to the device 100) could provide such requests to the high-speed invalidation unit 140.

The requests for invalidation or write-backs specify a range of virtual addresses over which invalidation or write back is requested. The high-speed invalidation unit 140 processes these requests to identify the one or more cache memories that store data corresponding to the provided range of virtual addresses. The high-speed invalidation unit 140 translates or breaks up the requests into micro-requests that are in a format appropriate for processing by the caches 142 and transmits those micro-requests to the appropriate caches.

The UTC invalidate unit 404 invalidates virtual-to-physical address translations that are cached in the UTCs 144, for the virtual addresses specified in the range of virtual addresses over which invalidation or write back is requested. This invalidation occurs to prevent in-flight operations (e.g., within SIMD units 138) from generating access requests to the one or more caches 142 for which data is being invalidated by a request. More specifically, if invalidation did not occur to the UTCs 144, in-flight operations attempting to access data that is about to be invalidated would be able to obtain physical addresses for data access and would then send requests to appropriate caches to access the data based on those physical addresses. These access attempts could result in an attempt to access invalid data or could result in an actual access of the invalid data after a request to invalidate the data has already been received by the high-speed invalidation unit 140. At the very least, this activity would result in increased memory traffic resulting in additional corrective action, which is undesirable. By invalidating virtual-to-physical address translations in the UTCs 144, this additional traffic is prevented. Instead, memory access requests cause a fault to occur because no valid translation exists in the APD 116. This fault is handled by the OS 120 to provide address translations. The high-speed invalidation unit 140 transmits a notification to the device driver 122 that causes the device driver to delay transmitting virtual-to-physical address translations for storage in UTCs 144 until after the requests have completed.

The cache invalidate and write-back unit 406 processes the invalidate and write-back requests received to generate micro-requests for transmission to the caches 142. The cache invalidate and write-back unit 406 determines which caches a particular request for invalidation or write-back is directed to and transmits the micro-requests to the caches for processing. Upon determining that a request is complete, the cache invalidate and write-back unit 406 transmits an acknowledgment for that request to the invalidate/write-back masters 402.

Figure 5:
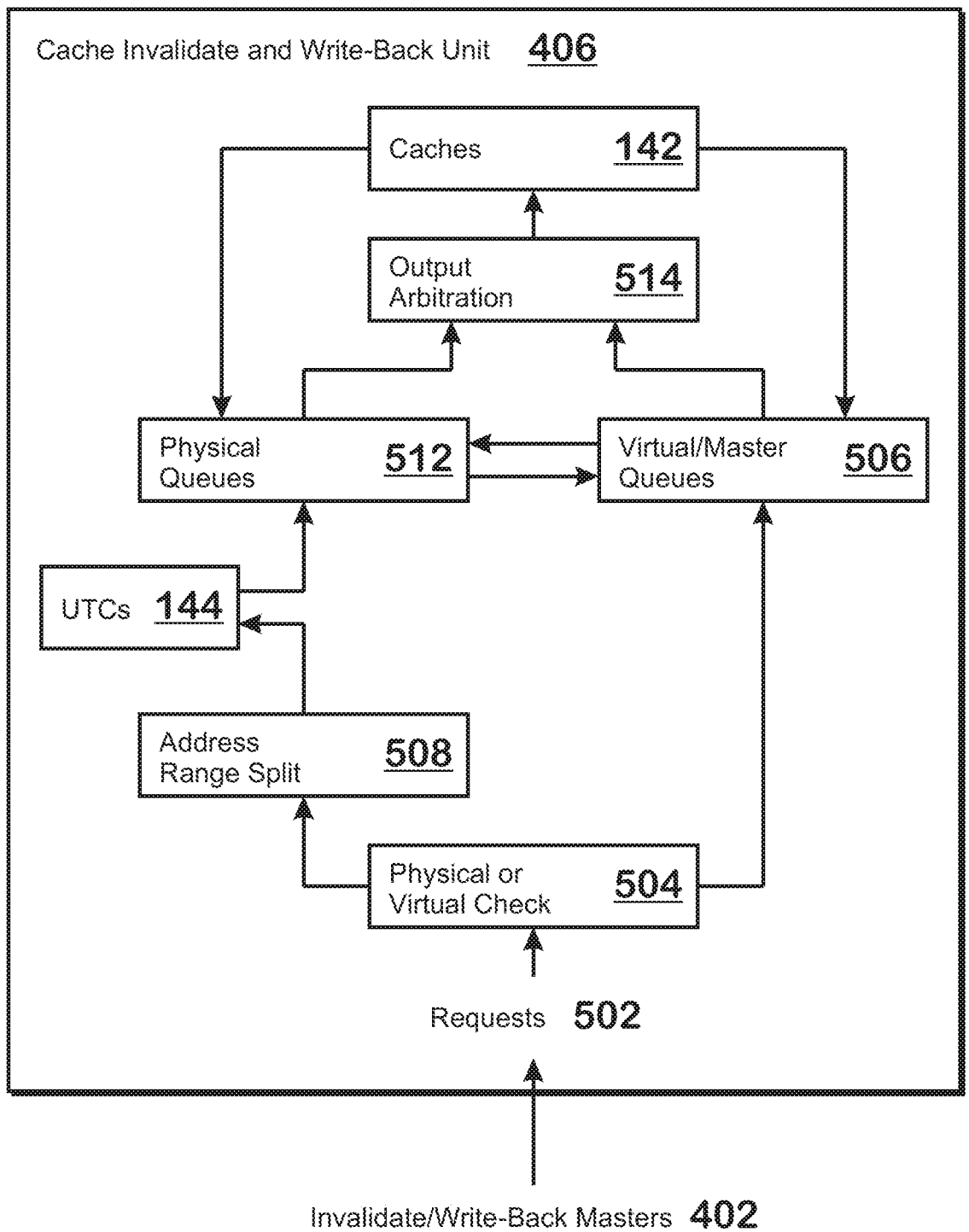
FIG. 5 is a block diagram illustrating details of the cache invalidate and write-back unit, according to an example.

FIG. 5 is a block diagram illustrating details of the cache invalidate and write-back unit 406, according to an example. The cache invalidate and write-back unit 406 includes a number of units that work together to process requests 502 for invalidations and write backs and to dispatch the requests to the caches 142.

The cache invalidate and write-back unit 406 receives requests 502 from the invalidate/write-back masters 402 (FIG. 4). These requests 502 are requests for invalidation or write-backs that specify a range of virtual addresses to perform operations on (or alternatively specify that cache data for all virtual addresses should be invalidated). The requests 502 include other parameters as well, including but not limited to one or more of: write-back and invalidation controls indicating whether the request 502 requests write-back of the specified data, invalidation of the specified data, or both; a sequence control indicating the order in which levels in the cache hierarchy are written back, invalidated, or both; and a range specifier indicating whether a range or all addresses are to be invalidated. An indication that all addresses are to be invalidated overrides the specification of address range.

The write-back and invalidation controls specify whether the write-back, invalidation, or both write-back and invalidation are to be performed for the data specified by the request for invalidation or write-back. Whether invalidation, write-back, or both is to be performed may be specified on a per-cache hierarchy level basis. In one example, the request specifies that data in the level 2 caches 408 and the level 1 caches 410 are to be invalidated, and that data in the level 0 caches 412 are not to be invalidated. In another example, the request 502 specifies that data in each level of cache (level 2, level 1, and level 0) is to be invalidated and that data in the level 2 caches 408 and the level 1 caches 410 are to be written back but data in the level 0 caches 412 are not to be written back. Write-back and invalidation can be enabled in this manner for any combination of cache hierarchy levels. For level 0 caches 412, the write-back and invalidation controls may enable or disable invalidations and write-backs for each of the specific caches of the level 0 caches. Thus, the write-back and invalidation controls may enable or disable write-backs and invalidations differently for each of the instruction caches 414, the scalar caches 416, and the vector caches 418.

The sequence control specifies the order of cache hierarchy levels in which the invalidation and write-back operations occur. The sequence control can specify an "increasing" order, meaning that invalidations and write-backs occur to the level 0 caches 412, then to the level 1 caches 410, and then to the level 2 caches 408. The sequence control can specify a "decreasing" order, meaning that invalidations and write-backs occur to the level 2 caches 408, then to the level 1 caches 410, and then to the level 0 caches 412. The sequence control can also specify parallel order meaning that invalidations and write-backs occur to the different hierarchy levels in parallel (e.g., no particular order is specified and invalidations and write-backs are allowed to occur to levels 0, 1, and 2 in at least partially overlapping time periods).

The physical or virtual check block 504 determines whether at least part of a request is to be directed to physically-tagged caches. Because requests specify virtual addresses, and not physical addresses to write-back or invalidate, if the request specifies that data in a physically tagged cache is to be invalidated, then virtual-to-physical address translation occurs. In some implementations, the physical or virtual check block 504 determines whether a particular request targets a physically-tagged cache by examining the write-back and invalidation controls. More specifically, because specific types of the caches 142 are physically tagged and other types of the caches 142 are virtually tagged, if write-back or invalidation is enabled for at least one of the physically tagged caches, then the physical or virtual check block 504 determines that address translation is to be performed. In one example, the level 2 caches 408, the level 1 caches 410, the scalar caches 416, and the vector caches 418 are all physically tagged and the instruction caches 414 are virtually tagged. Thus if the write-back and invalidation controls specify that at least one of the level 2 caches 408, the level 1 caches 410, the scalar caches 416, and the vector caches 418 are to be invalidated or written back, then the physical or virtual check block 504 determines that address translation is to be performed.

Regardless of whether address translation is to be performed for a particular request, the physical or virtual check block 504 transmits the request to the virtual/master queues 506, which stores indications of pending requests. If address translation is to be performed for a request, then the physical or virtual check block 504 also transmits the request to the address range split block 508. Note that address translation does not have to be performed for requests 502 that indicate that all addresses are to be invalidated or written back because all entries in physically tagged caches are invalidated or written back in that situation.

The address range split block 508 divides the address range into page-aligned requests for address translation. More specifically, the address range split block 508 divides the request into multiple address translation requests, each targeting a page-aligned portion of the range specified by the original large request. Each page-aligned portion may specify a range including a single memory page, or multiple memory pages. In some implementations, the address range split block 508 divides the request into multiple single-page requests, where the page size of the single-page requests is the smallest page size addressable in the virtual memory space. For example, if the virtual memory space used by the APD 116 and maintained by the operating system 120 allows for page sizes of 4 kilobytes ("KB") and 2 megabytes ("MB"), the request would be divided into multiple requests, each specifying a different 4 KB page (and not a different 2 MB page, since 2 MB is not the smallest memory page). The purpose of dividing the request up is to allow multiple address translations to occur in parallel. Once addresses have been translated for each of the split-up requests, the resulting physical addresses are combined with the original request and transmitted to the physical queues 512.

A latency-hiding first-in-first-out ("FIFO") buffer (not shown) may be present between the address range split 508 and the physical queues 512. The latency-hiding FIFO buffer hides latency by storing a large number of outstanding split-up (e.g., single-page) translation requests so that latency of one translation to the UTCs 144 is amortized across each of the outstanding translation requests. In one example, the latency-hiding FIFO buffer stores 128 translation requests and the latency for address translation in the UTCs 144 is 2000 cycles. Without the latency-hiding FIFO buffer, the UTCs 144 would process translation requests one-by-one, resulting in each translation request having a latency of 2000 cycles. The latency-hiding FIFO buffer keeps track of multiple outstanding requests which can be sent to the UTCs 144 and processed in parallel, reducing the overall latency.

In some implementations, the UTCs 144 used by the address range split unit 508 is the level 2 UTC 420. In addition, the virtual-to-physical address translations in the level 2 UTC 420 to be used by a particular request 502 may be marked as invalid due to the operations performed by the UTC invalidate unit 404 mentioned above. In typical operation (e.g., when the translation is triggered by an instruction executing in a SIMD unit 138), a virtual-to-physical address translation lookup in the level 2 UTC 420 that encounters an invalid translation would not return the translation and would cause the level 2 UTC 420 to request the valid translation from another location or element (e.g., the operating system 120). However, when performing address translation for the address range split unit 508, the UTCs 144 return an address translation even if that address translation is marked as invalid in the UTCs 144. Use of "invalid" translations in this manner assists with the speed in which invalidations occur by preventing the address range split block 508 from being forced to communicate with a different element (e.g., the operating system 120) to obtain translations for cache invalidations.

Turning now to the virtual/master queues 506, these queues 506 receive all requests 502 issued by the invalidate/write-back masters 402. The virtual/master queues 506 handle requests 502 differently depending on whether a request 502 is to use address translation or not. For requests that are directed to virtually tagged caches, the virtual/master queues 506 directly orchestrates the issuance of cache invalidate and write-back micro-transactions to the caches 142, issuing micro-transactions to the caches 142 via the output arbitration unit 514 (an arbitration unit that selects from among pending micro-transactions to be sent to the caches 142), through which the micro-transactions are issued to the caches 142, receives acknowledgments of completion of the micro-transactions from the caches 142, and transmits acknowledgments of completion to the invalidate/write-back masters 402 upon detecting that a request 502 has completed. For requests that are directed to physically tagged caches, the virtual/master queues 506 act as a master to the physical queues 512. More specifically, both the physical queues 512 and the virtual/aster queues 506 hold such requests 502 until completion. Because the physical queues 512 hold the physical addresses for transmission to the physically-tagged caches, the physical queues 512 transmit micro-transactions to the caches 142 via the output arbitration block 514 and receive acknowledgment signals when such micro-transactions are complete from the caches 142. Upon receiving acknowledgment signals for all micro-transactions of a request 502, the physical queues 512 notify the virtual/master queues 506 that the request 502 is complete and the virtual/master queues 506 transmit a corresponding acknowledgment signal to the invalidate/write-back masters 402.

Some requests 502 involve both physically and virtually tagged caches. For such requests, the virtual/master queues 506 act as both primary queues and as master queues to the physical queues 512. More specifically, the virtual/master queues 506 send micro-transactions to the caches 142 for the virtually tagged caches and the physical queues 512 send micro-transactions to the caches 142 for the physically tagged caches. For micro-transactions sent by the physical queues 512 to the caches 142, when the physical queues 512 receive acknowledgments from the caches 142 that micro-translations have completed, the physical queues 512 transmit those acknowledgments to the virtual/master queues 506. When acknowledgments for all caches and memory address ranges have been received at the virtual/master queues 506 (either directly from caches 142 for virtually tagged caches or from the physical queues 512 for physically tagged caches), the virtual/master queues 506 transmit an acknowledgment to the invalidate/write-back masters 402 indicating that the request 502 has been completed.

The virtual/master queues 506 and the physical queues 512 each include a number of individual queues. Each individual queue manages a particular request 502 from the time the request 502 is received in the physical queues 512 and/or virtual/master queues 506 until an acknowledgment for the request 502 is sent back to the invalidate/write-back masters 402. Each queue manages the requests by transmitting the micro-transactions to the caches 142, accumulating acknowledgments from the caches 142 (and the physical queues 512 for queues in the virtual/master queues 506), waiting for acknowledgments from the physical queues 512, for the virtual/master queues 506, and the like. If a request 502 specifies a sequence control of "increasing" order or "decreasing" order, then the individual queue in the physical queues 512 or virtual/master queues 506 manages that particular request 502 by sending micro transactions for the first cache hierarchy level specified by the sequence control order, waiting for acknowledgments for those requests, then the next cache hierarchy level specified by the sequence control order, waiting for acknowledgments for those requests, and then the next cache hierarchy level specified by the sequence control order. For "parallel" sequence order, the queue in the physical queues 512 or virtual/master queues 506 do not wait for acknowledgments as just described. Each individual queue in the virtual/master queues 506 and the physical queues 512 operates independently, meaning that each queue processes requests 502 in parallel with the other queues. The number of individual queues is variable. In one example, the virtual/master queues 506 include 16 queues and the physical queues 512 include 32 queues.

Micro-transactions are requests for cache invalidation or write-back that may be more specific that the requests 502. For instance, the micro-transactions may be directed to specific caches, may specify only a single type of operation (e.g., write-back or invalidate—both types of micro-transactions would be sent out for a request 502 that specifies both write-back and invalidates), may be directed to only one specific cache (e.g., one to a level 2 cache, one to the level 1 cache, and so on, where a request 502 may need multiple such messages for completion), and may be more specific than requests 502 in other ways. The micro-transactions are processed by the various cache memories, which, upon finishing processing micro-transactions, return acknowledgment signals to the physical queues 512 and/or virtual/master queues 506.

Figure 6:
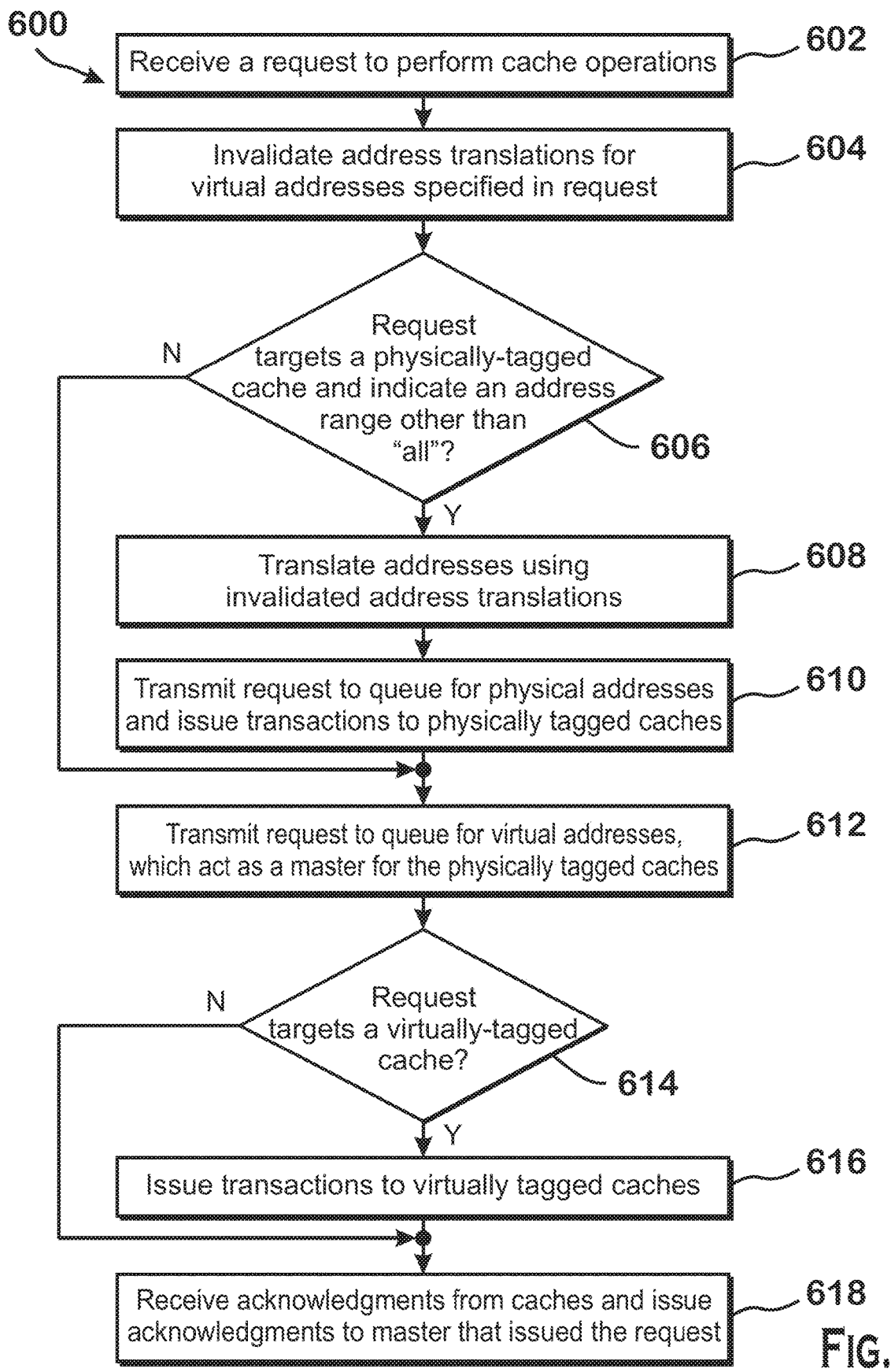
FIG. 6 is a flow diagram of a method for providing out-of-order cache returns to workgroups, according to an example.

FIG. 6 is a flow diagram of a method 600 for providing out-of-order cache returns to workgroups, according to an example. Although described with respect to the system shown and described with respect to FIGS. 1-5, it should be understood that any system configured to perform the method, in any technically feasible order, falls within the scope of the present disclosure.

The method 600 beings at step 602, where a high-speed invalidation block 140 of an APD 400 receives a request to perform cache operations. The cache operations include one or both of invalidating or writing back data stored in one or more caches in the APD 400. The request comes from invalidate/write-back masters 402, which includes, without limitation, one or more of an a dynamic memory access engine that reads buffers filled by other units of the device 100 (the processor 102 or other units not explicitly depicted in FIGS. 1 and 2), program input/output registers that cause requests to be generated and are writeable by other elements of the device 100, the scheduler 136 of the APD 116/400, SIMD units 138 in the APD 116/400, or other elements in the device 100. In one example, shader programs include instructions that are converted into the requests. In another example, commands received by the APD 116/400 for processing by the graphics processing pipeline 134 may include commands that are converted into the requests.

At step 604, the UTC invalidate unit 404 invalidates virtual-to-physical address translations in the UTCs 144 so that pending instructions do not attempt to access data that is being operated on as a result of the request received in step 602, but instead cause translations to be fetched from the operating system 120. The high-speed invalidation 140 block also informs the device driver 122 not to return those translations to the APD 400 until the request has been processed.

At step 606, the physical or virtual check block 504 of the cache invalidate and write-back unit 406 determines whether the request targets physically tagged caches. As described above, requests can specify what types of caches are to be acted upon (invalidated and/or written back). If the request does target a physically tagged cache, then the method 600 proceeds to step 608 and if the request does not target a physically tagged cache, then the method 600 proceeds to step 612.

At step 608, the physical or virtual check block 504 passes the request to the UTCs 144 for translation. An address range splitter 508 may split up the address range specified in the request to generate multiple page-aligned translation requests for processing by the UTCs 144 in parallel. The translations are performed using invalidated entries in the UTCs 144, since those entries were invalidated at step 604.

At step 610, after obtaining address translations for the request, the UTCs 144 or other unit that is holding the requests pending address translation transmits the request to the physical queues 512 for processing. The physical queues 512 issue transactions to the physically tagged queues for processing.

At step 612, the physical or virtual check block 504 transmits the request to the virtual/master queues 506 for processing. This transmission occurs even if the request only targets physically tagged caches because the virtual/master queues 506 acts as a master for the physical queues 512.

At step 614, the virtual/master queues 506 determine whether the request targets a virtually-tagged cache. If the request targets a virtually tagged cache, then the method proceeds to step 616 and if the request does not target a virtually tagged cache, then the method proceeds to step 618. At step 616, the virtual/master queues 506 issue transactions to the caches 142 based on the request. At step 618, the physical queues 512 and virtual/master queues 506 receive acknowledgments of completion from the caches 142 and transmit acknowledgments to the invalidate/write-back masters 402. More specifically, the physical queues 512 transmit acknowledgments to the virtual/master queues 506 upon receiving such acknowledgments from the caches 142 for physically tagged caches. The virtual/master queues 506 receive acknowledgments from virtually tagged caches. Upon receiving acknowledgments for all transactions for a request, the virtual/master queues 506 transmits an acknowledgment to the invalidate/write-back masters 402 indicating that a request is complete. At this point, the device driver 122 also stops delaying translations from being sent from the operating system 120 to update the UTCs 144.

The techniques described herein allow for high throughput and low latency targeted cache invalidates in an accelerated processing device. Splitting up requests for virtually and physically targeted queues allows operations for such requests to be processed in parallel. Allowing address translations for physically-tagged caches to be done with invalidated UTC entries helps to improve throughput and reduce latency. Splitting up address ranges specified in requests into multiple address ranges for translation and then translating those addresses in parallel also improves latency and throughput. Including multiple queues for processing requests in parallel improves latency and throughput as well.

A method for performing cache operations is provided. The method includes receiving a first request to perform a first set of cache operations for a first set of virtual addresses referring to a first set of data stored in a set of caches in an accelerated processing device ("APD"). The method also includes invalidating a first set of translation entries in a set of virtual-to-physical address translation caches, the first set of translation entries corresponding to the first set of virtual addresses. The method further includes determining that the first request specifies that the first set of cache operations be performed on a physically tagged cache. The method also includes translating a virtual address in the first set of virtual addresses using one or more of the invalidated translation entries in the set of virtual-to-physical address translation caches to generate a physical address. The method further includes issuing one or more transactions specified by the first request to the physically tagged cache based on the one or more physical addresses.

An accelerated processing device ("APD") for performing cache operations is provided. The APD includes a high-speed invalidation unit, a set of caches, and a set of virtual-to-physical address translation caches configured to store virtual-to-physical address translations. The high-speed invalidation unit is configured to receive a first request to perform a first set of cache operations for a first set of virtual addresses referring to a first set of data stored in the set of caches, invalidate a first set of translation entries in the set of virtual-to-physical address translation caches, the first set of translation entries corresponding to the first set of virtual addresses, determine that the first request specifies that the first set of cache operations be performed on a physically tagged cache, translate a virtual address in the first set of virtual addresses using one or more of the invalidated translation entries in the set of virtual-to-physical address translation caches to generate a physical address, and issue one or more transactions specified by the first request to the physically tagged cache based on the one or more physical addresses.

A computer system is also provided. The computer system includes a processor, and an accelerated processing device ("APD") for performing cache operations, the APD being coupled to the processor. The APD includes a high-speed invalidation unit, a set of caches, and a set of virtual-to-physical address translation caches configured to store virtual-to-physical address translations. The high-speed invalidation unit is configured to receive a first request to perform a first set of cache operations for a first set of virtual addresses referring to a first set of data stored in the set of caches, invalidate a first set of translation entries in the set of virtual-to-physical address translation caches, the first set of translation entries corresponding to the first set of virtual addresses, determine that the first request specifies that the first set of cache operations be performed on a physically tagged cache, translate a virtual address in the first set of virtual addresses using one or more of the invalidated translation entries in the set of virtual-to-physical address translation caches to generate a physical address, and issue one or more transactions specified by the first request to the physically tagged cache based on the one or more physical addresses.

It should be understood that many variations are possible based on the disclosure herein. Although features and elements are described above in particular combinations, each feature or element may be used alone without the other features and elements or in various combinations with or without other features and elements.

Various elements in block diagrams represent appropriate hardware, software, or combinations thereof that are configured to perform the operations described.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing cache operations, the method comprising:
   receiving a first request to perform a first set of cache operations, the cache operations including cache invalidation operations for a first set of virtual addresses referring to a first set of data stored in a set of caches in an accelerated processing device ("APD");
   responsive to the first request, invalidating a first set of translation entries in a set of virtual-to-physical address translation caches, the first set of translation entries corresponding to the first set of virtual addresses;
   determining that the first request specifies that the first set of cache operations be performed on a physically tagged cache;
   translating a virtual address in the first set of virtual addresses by performing a lookup with one or more of the first set of virtual addresses, on one or more of the invalidated translation entries in the set of virtual-to-physical address translation caches and receiving one or more physical addresses from the invalidated translation entries; and issuing one or more transactions specified by the first request to the physically tagged cache based on the one or more physical addresses.

2. The method of claim 1, further comprising:
   determining that the first request also specifies that the first set of cache operations be performed on a virtually tagged cache; and
   issuing one or more transactions specified by the first request to the virtually tagged cache based on the first set of virtual addresses without performing address translation.

3. The method of claim 2, wherein:
   translating the virtual address in the first set of virtual addresses comprises transmitting at least a portion of the first request to a universal translation cache that stores virtual-to-physical address translations; and
   issuing the one or more transactions comprises:
      receiving one or more translations from the universal translation cache;
      transmitting one or more transactions based on the one or more translations to a physical address work queue; and
      issuing the one or more transactions from the physical address work queue to the physically tagged cache.

4. The method of claim 3, wherein issuing the one or more transactions further comprises:
   transmitting the one or more transactions to a virtual address work queue to serve as a master queue;
   responsive to detecting completion of the one or more transactions in the physically tagged cache, transmitting an physical address work queue acknowledgment from the physical address queue to the virtual address queue; and
   responsive to receiving the physical address work queue acknowledgment, transmitting a request complete acknowledgment to a master unit from which the first request is received.

5. The method of claim 3, wherein issuing the one or more transactions further comprises:
   dividing the first set of virtual addresses into a plurality of page-aligned virtual address ranges; and
   issuing a different translation for each page-aligned virtual address range for processing by the universal translation cache in parallel.

6. The method of claim 5, wherein:
   issuing the one or more transactions further comprises transmitting the plurality of page-aligned virtual address ranges to a latency hiding first-in-first-out ("FIFO") buffer;
   the one or more translations received from the universal translation cache are responsive to requests for translation of the plurality of page-aligned virtual address ranges; and
   transmitting one or more transactions based on the one or more translations to a physical address work queue is performed responsive to receiving translations for each of the page-aligned virtual address ranges corresponding to the first request at the FIFO buffer.

7. The method of claim 1, further comprising:
   receiving a second request to perform a second set of cache operations for a second set of virtual addresses referring to a second set of data stored in the set of caches;
   invalidating a second set of translation entries in the set of virtual-to-physical address translation caches;

determining that the second request specifies that data corresponding to all virtual addresses is to be invalidated;

determining that the second request specifies that the second set of cache operations are to be performed on data stored in at least one physically tagged cache; and issuing one or more transactions specified by the second request to the at least one physically tagged cache without translating the second set of virtual addresses.

8. The method of claim 7, wherein issuing the one or more transactions comprises:

issuing one or more transactions from a virtual address queue to the set of caches, but not issuing one or more transactions from a physical address queue to the set of caches.

9. The method of claim 1, wherein the set of caches includes one or more of:

a level 2 cache common to processing elements in the APD;

a level 1 cache common to a sub-grouping of the processing elements in the APD; and level 0 caches common to sub-groupings of the processing elements in the APD, the level 0 caches including one or more of an instruction cache, a scalar cache, and a vector cache.

10. An accelerated processing device ("APD") for performing cache operations, the APD comprising:

a high-speed invalidation unit;

a set of caches; and a set of virtual-to-physical address translation caches configured to store virtual-to-physical address translations, wherein the high-speed invalidation unit is configured to:

receive a first request to perform a first set of cache operations, the cache operations including cache invalidation operations for a first set of virtual addresses referring to a first set of data stored in the set of caches;

responsive to the first request, invalidate a first set of translation entries in the set of virtual-to-physical address translation caches, the first set of translation entries corresponding to the first set of virtual addresses;

determine that the first request specifies that the first set of cache operations be performed on a physically tagged cache;

translate a virtual address in the first set of virtual addresses by performing a lookup with one or more of the first set of virtual addresses, on one or more of the invalidated translation entries in the set of virtual-to-physical address translation caches and receiving one or more physical addresses from the invalidated translation entries; and issue one or more transactions specified by the first request to the physically tagged cache based on the one or more physical addresses.

11. The APD of claim 10, wherein the high-speed invalidation unit is further configured to:

determine that the first request also specifies that the first set of cache operations be performed on a virtually tagged cache; and issue one or more transactions specified by the first request to the virtually tagged cache based on the first set of virtual addresses without performing address translation.

12. The APD of claim 11, wherein:

translating the virtual address in the first set of virtual addresses comprises transmitting at least a portion of the first request to a universal translation cache that stores virtual-to-physical address translations; and issuing the one or more transactions comprises:

receiving one or more translations from the universal translation cache;

transmitting one or more transactions based on the one or more translations to a physical address work queue; and issuing the one or more transactions from the physical address work queue to the physically tagged cache.

13. The APD of claim 12, wherein issuing the one or more transactions further comprises:

transmitting the one or more transactions to a virtual address work queue to serve as a master queue;

responsive to detecting completion of the one or more transactions in the physically tagged cache, transmitting an physical address work queue acknowledgment from the physical address queue to the virtual address queue; and responsive to receiving the physical address work queue acknowledgment, transmitting a request complete acknowledgment to a master unit from which the first request is received.

14. The APD of claim 12, wherein issuing the one or more transactions further comprises:

dividing the first set of virtual addresses into a plurality of page-aligned virtual address ranges; and issuing a different translation for each page-aligned virtual address range for processing by the universal translation cache in parallel.

15. The APD of claim 14, wherein:

issuing the one or more transactions further comprises transmitting the plurality of page-aligned virtual address ranges to a latency hiding first-in-first-out ("FIFO") buffer;

the one or more translations received from the universal translation cache are responsive to requests for translation of the plurality of page-aligned virtual address ranges; and transmitting one or more transactions based on the one or more translations to a physical address work queue is performed responsive to receiving translations for each of the page-aligned virtual address ranges corresponding to the first request at the FIFO buffer.

16. The APD of claim 10, wherein the high-speed invalidation unit is further configured to:

receive a second request to perform a second set of cache operations for a second set of virtual addresses referring to a second set of data stored in the set of caches;

invalidate a second set of translation entries in the set of virtual-to-physical address translation caches;

determine that the second request specifies that data corresponding to all virtual addresses is to be invalidated;

determine that the second request specifies that the second set of cache operations are to be performed on data stored in at least one physically tagged cache; and issue one or more transactions specified by the second request to the at least one physically tagged cache without translating the second set of virtual addresses.

17. The APD of claim 16, wherein issuing the one or more transactions comprises:

issuing one or more transactions from a virtual address queue to the set of caches, but not issuing one or more transactions from a physical address queue to the set of caches.

18. The APD of claim 10, wherein the set of caches includes one or more of:

a level 2 cache common to processing elements in the APD;

a level 1 cache common to a sub-grouping of the processing elements in the APD; and level 0 caches common to sub-groupings of the processing elements in the APD, the level 0 caches including one or more of an instruction cache, a scalar cache, and a vector cache.

19. A computing device, comprising:

a processor; and an accelerated processing device ("APD") for performing cache operations, the APD being coupled to the processor, the APD comprising:

a high-speed invalidation unit;

a set of caches; and a set of virtual-to-physical address translation caches configured to store virtual-to-physical address translations, wherein the high-speed invalidation unit is configured to:

receive a first request to perform a first set of cache operations, the cache operations including cache invalidation operations for a first set of virtual addresses referring to a first set of data stored in the set of caches;

responsive to the first request, invalidate a first set of translation entries in the set of virtual-to-physical address translation caches, the first set of translation entries corresponding to the first set of virtual addresses;

determine that the first request specifies that the first set of cache operations be performed on a physically tagged cache;

translate a virtual address in the first set of virtual addresses by performing a lookup with one or more of the first set of virtual addresses, on one or more of the invalidated translation entries in the set of virtual-to-physical address translation caches and receiving one or more physical addresses from the invalidated translation entries; and issue one or more transactions specified by the first request to the physically tagged cache based on the one or more physical addresses.

20. The computing device of claim 19, wherein the first request is received from the processor.

* * * * *